Nov. 17, 1959  G. W. LAWSON  2,912,823
GAS TURBINE ENGINE WITH FREE TURBINE POWER TAKE-OFF
Filed Nov. 25, 1955
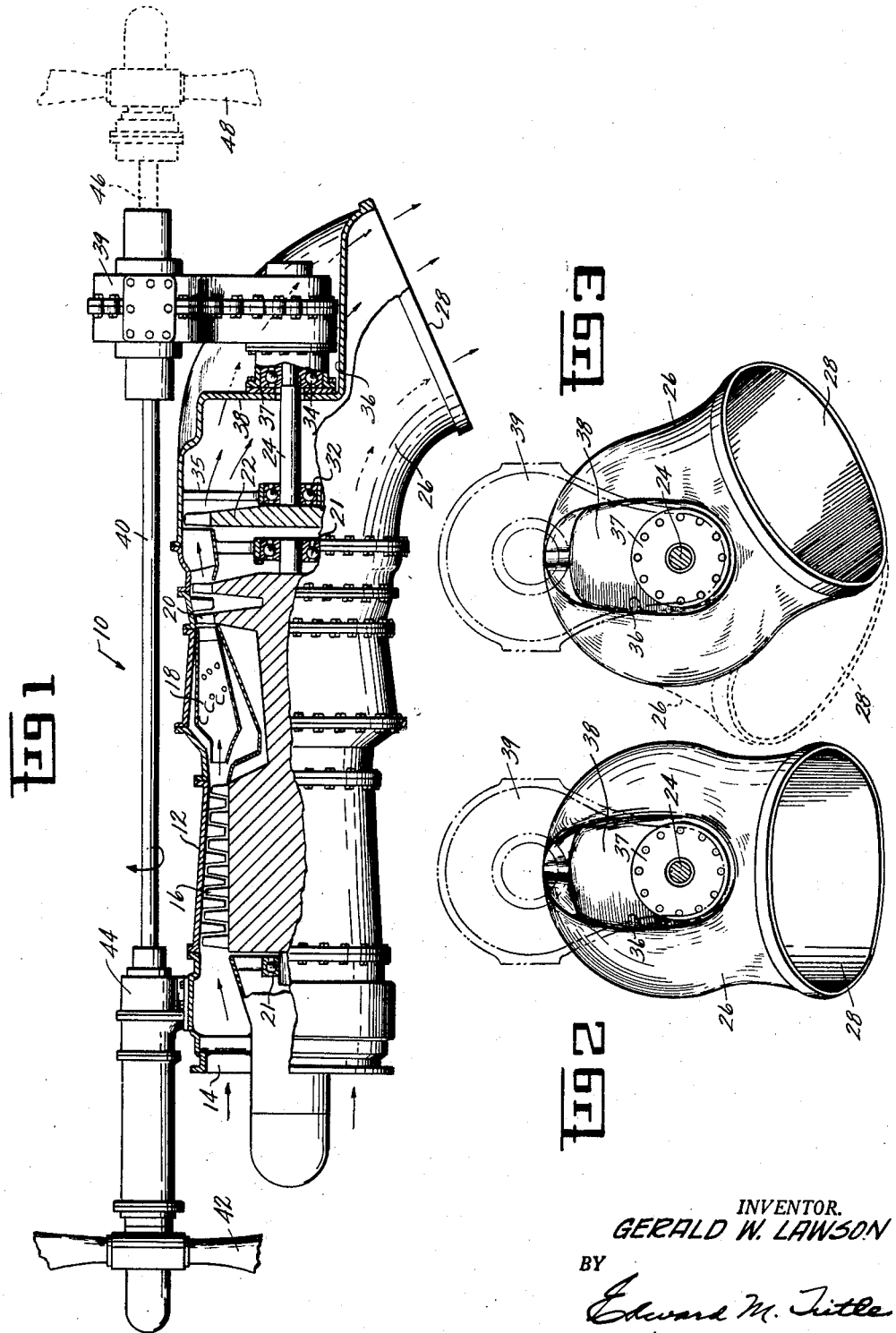
INVENTOR.
GERALD W. LAWSON
BY
Edward M. Title
HIS ATTORNEY—

United States Patent Office 2,912,823
Patented Nov. 17, 1959

2,912,823

GAS TURBINE ENGINE WITH FREE TURBINE POWER TAKE-OFF

Gerald William Lawson, Lynnfield, Mass., assignor to General Electric Company, a corporation of New York Application November 25, 1955, Serial No. 548,987

2 Claims. (Cl. 60—39.16)

This invention relates to a gas turbine engine and in particular to a free turbine type turbomachine.

In general, turbine type engines comprise an axial flow compressor or the like for compressing the air taken on board the engine which directs the compressed air into the combustion system where the combustion process takes place. After the combustion process takes place, the hot gases pass downstream through a turbine which generally is fixed to the compressor for the rotation thereof, and then the exhaust gases continue to pass outwardly through the tailpipe and exhaust nozzle to the atmosphere. In shaft power engines, the turbine generally consists of either a plurality of stages with the load or propeller connected to the front portion of the compressor or one of the stages is a free turbine which can be used to drive the load by a shaft extending from the free turbine through the compressor turbine and torque shaft, out through the compressor to the front thereof for connection to a propeller through a reduction gearing unit.

In designing a small aircraft engine having minimum weight and high efficiency, difficulties arise in using the aforementioned methods of construction. Various types of problems resulting from the internal shafts and supports as well as the gearing units required at the output end of the driven shaft will seriously result in diminishing the optimum size, weight and performance. In the first type engine, where the power turbine is connected directly to the compressor and then to the load such as a helicopter rotor, propeller or the like, efficient control of the rotor or propeller becomes difficult. For use in helicopters or the like it is very desirable to drive and control the propellers separate from the turbine and compressor. It is therefore an object of this invention to provide a shaft power engine in which a drive shaft is provided and controlled separate and apart from the turbine and compressor.

In the second type of turboprop, for example, a free turbine for driving the load is connected to a propeller by a shaft extending through the compressor turbine, turbine rotor shaft, and compressor rotor outwardly to the front of the engine. Generally, a gear reduction unit connecting the shaft to the propeller is used. This type of a construction creates a problem in that the power shaft from the power turbine to the gear reduction unit is quite long and may be subjected to severe critical vibrations. In order to withstand such vibrations, the shaft must be made relatively large to withstand the vibratory stresses. However, if the diameter of the shaft is increased, then the bearings upon which the compressor turbine is mounted can not carry the loads. In other words, in order to design a light weight power package which can still produce a sufficiently high horse-power, say 1300 H.P. at 20,000 r.p.m., the bearing on the outer shaft must travel at such a speed that the load carrying capacity of the bearings falls off. It is therefore another object of this invention to provide a turbine arrangement which eliminates the above bearing difficulties by taking the power-shaft from the free turbine out through the casing instead of through the compressor rotor so as to enable the engine to run at the high speeds.

In utilizing a gas turbine engine in which the turbine consists of two independent turbine rotors in which one of the turbine rotors drives the compressor and the other the load, the problem results in how to extend the power shaft through the casing to the load without going through the turbine compressor and how to avoid subjecting any gearing to the hot exhaust gases. If the gear reduction unit is inserted into the hot gas stream, the high temperatures encountered will not only weaken the parts, but they will not be able to function properly in the high ambient temperatures. Also, if bevel gears are used in the gas streams that take off from the power-shaft and extend through the casing, a high thrust will be produced from the bevel gears so as to act on the bearings in the casing. The resulting speeds of the gears put tremendous loads on the bears, and the bearings are not designed to withstand such loads. For optimum light weight design, the casing is not sufficiently strong in this regard and will therefore necessarily require a certain amount of heavy structure. This will necessarily result in defeating the purposes of the invention, namely to provide a light and efficient high speed shaft power engine. Also, the speeds encountered would not permit the casing to take the load generated. This taken in connection with the high temperatures surrounding the bevel gears, would not permit their use. It is therefore another object to provide a means outside of the gas stream for taking off from the power-turbine for driving the load without placing gear reduction units or bevel gears in the gas stream.

These and other objects will become more apparent when read in the light of the accompanying specification and claims wherein the parts are designated specifically but are intended to be regarded as generically as the prior art will permit wherein:

Figure 1 is a cross-sectional view of the engine showing the compressor, turbine and exhaust, Figure 2 is an end view showing the relationship of the reduction gear unit with respect to the tailpipe of the engine, Figure 3 is an end view showing the exhaust nozzle at an angle to the vertical plane through the axis.

Briefly stated and in accordance with one aspect of the invention a shaft power engine having a free power turbine is provided in which a portion of the casing is adapted to support a power shaft extending from the free turbine for driving a load.

Referring to the figures, the engine is generally designated by the numeral 10 and has a conventional compressor, combustor and turbine. The engine includes a casing 12 having an inlet 14 for taking air on board the engine. A compressor 16 is shown for compressing the air. An annular combustion system 18 is provided for supporting the combustion process in any well-known conventional manner such as by providing fuel for mixing with the compressed air and igniting the mixture by a spark plug arrangement or the like. The turbine is shown at 20 for taking energy out of the combustion gases for driving the compressor 16. The turbine 20 is shown connected directly to a compressor 16 and being supported on bearings 21. A power turbine is shown at 22 for taking further energy out of the combustion gases to drive a load. In this connection the power turbine is referred to as the free turbine in order to drive a propeller or helicopter rotor separate and apart from the compressor turbine 20. The free turbine provides an easy means to separately control the propeller or helicopter rotor independently of the turbine and compressor.

The power turbine 22 drives a power shaft 24. In order to direct the hot gases from the combustion chambers and turbine away from the critical parts of the engine, for example, the gear reduction unit, a tailpipe is provided having its intermediate portion 26 curved at some angle, say thirty degrees to the axis of the engine. Although this particular angle has been found to be the most desirable, other angles for the direction of the tailpipe can be used. An exhaust nozzle is shown at 28 for disposing of the exhaust gases to the atmosphere. In order to support the power turbine and the power shaft, bearings 32 and 34 are shown. The bearing 32 is normally held in position by struts or the like 35 extending from the casing into the gas stream. However, the bearing 34 is supported on a pad 37 mounted on the outside of a depression 36 in the tailpipe. This depression adds strength to the structure of the tailpipe without increasing the weight. It is noted that a transverse wall 38 of the depression 36 tends to withstand the torque loads transmitted from the power turbine and power shaft, as compared to using the normal type casing as a support for the bearing. The wall 38 of the depression 36 extends into the tailpipe sufficient to intersect the axis of the turbine or the axis of the upstream end of the tailpipe. This construction enables the power shaft to be mounted axially in the engine. This is the most desirable position for the power shaft although it could extend at an angle to the axis depending on the position of the wall 38. It is noted that the depression can be formed in the tailpipe by stamping it in originally or by building it up in sections by welding the parts together.

In order to transmit the power taken from the power turbine 22 and the power shaft 24 a gear reduction unit 39 is mounted on the pad 37 outside of the tailpipe. The other end of the gear reduction unit 39, which is adapted to receive the power transmitted, has a propeller shaft 40 mounted therein which is parallel to the power shaft 24. The other end of the parallel shaft is provided with a propeller 42. The parallel shaft 40 is also rotatably mounted on the compressor casing by a support 44. If the shaft 40 is used to drive a helicopter rotor, it may extend in a perpendicular direction rather than parallel, and of course, require a different type gear reduction unit, well known in the art.

It is recognized that this engine can also be utilized as a pusher type engine and in such case a propeller shaft or the like 46 can be used for driving the propeller 48. Further, the engine can be used so that power can be taken in both directions without the necessity of using a transfer gear box commonly used in connection with piston engines.

Another advantage of the engine is its adaptability to having the curved tailpipe rotated with respect to the remainder of the engine. This is desirable in order to direct the exhaust gases in any direction so as not to impinge on any critical part of the airplane or helicopter in which it is being used. If it is desirable to rotate the curved tailpipe in another direction such as shown in Figure 3, then the depression in the tailpipe is formed at an angle to the vertical axis of the exhaust end.

In operation, air is taken on board the engine through the inlet 14 into the compressor 16 where the air is compressed. The air is then passed into the combustion chamber 18 for the combustion process where the mixture of fuel and air is ignited. The combustion gases then pass downstream through the turbine compressor 20. The turbine 20 takes sufficient energy out of the gases to drive the compressor 16. The free turbine 22 also takes out a portion of the energy in the hot gases for driving the load which in this case is the propeller 42, or propeller 48, or both. Since the free turbine is not connected to the main compressor turbine, it can be controlled separately by any well known means. The exhaust gases are then passed through the curved tailpipe 26 and dumped overboard through the exhaust nozzle 28. It is noted that as the gases pass through the tailpipe 26, they do not impinge directly on any of the portions of the gear reduction unit. As a result of the curved tailpipe and transverse wall 38, the gears in the gear reduction unit 39 are not subjected to the high temperatures encountered in the gas stream. These temperatures can cause various types of differential thermal expansion of the parts creating excessive wear which in short course would cause tremendous vibrations tending to destroy the engine.

As a result of this engine, the external parallel shaft 40 is more readily placed in its most efficient position. The shaft 40 enables the propeller 42 to be offset from the compressor inlet 14. This is desirable since in a small engine the hub and pitch adjusting mechanism for varying the propeller position blocks off the compressor if placed on the axis of the engine. The propeller can be placed so that the best portion of the propeller for optimum operation can be properly positioned in front of the compressor.

The simplicity of design permits a high speed engine of small weight and size construction without requiring heavy and cumbersome structural members for withstanding the loads. Although a curved tailpipe has been shown and described it is intended that the invention cover any type of nonlinear tailpipe which permits the power shaft to extend through the casing of the tailpipe to a gear reduction unit.

While the particular embodiments of the invention have been illustrated and described, it will be obvious to those skilled in the art that various change and modifications may be made without departing from the invention. It is intended to cover in the appended claims all such changes and modifications that come within the true spirit and scope of the invention.

What I claim as new and desire to secure by Letters Patent of the United States is:

1. In a turbomachine comprising a compressor, combustion chamber and a turbine connected to the compressor and a free turbine provided with a power shaft, a tailpipe for said turbo machine, a depression in said tailpipe having one side thereof extending at least partially transversely of the tailpipe, and support means on said transverse side and said tailpipe for supporting the free turbine and power shaft, and load means being driven by said power shaft.

2. A turbomachine comprising a main engine portion including a compressor, a combustion chamber and a turbine for driving the compressor, a tailpipe mounted on said main engine portion at the turbine end thereof, a depression in said tailpipe having a wall portion extending at least partially transversely of the axis of said main engine portion, a gear reduction unit mounted on said transversely extending wall portion, and a free power turbine mounted in and supported by said tailpipe, said free power turbine being connected in driving relationship to said gear box by a power shaft extending through said transversely extending wall portion.

References Cited in the file of this patent

UNITED STATES PATENTS

| | | |
|---|---|---|
| 1,320,671 | Baumann | Nov. 4, 1919 |
| 2,428,830 | Birmann | Oct. 14, 1947 |
| 2,503,172 | Pullin | Apr. 4, 1950 |
| 2,511,130 | Sedille et al. | June 13, 1950 |
| 2,537,487 | Stone | Jan. 9, 1951 |
| 2,564,107 | Holley | Aug. 14, 1951 |
| 2,569,996 | Kollsman | Oct. 2, 1951 |
| 2,611,242 | Bell | Sept. 23, 1952 |
| 2,629,982 | Hooker | Mar. 3, 1953 |
| 2,681,547 | MacDonald | June 22, 1954 |
| 2,687,613 | Craigon | Aug. 31, 1954 |
| 2,696,709 | Oulianoff | Dec. 14, 1954 |

FOREIGN PATENTS

| | | |
|---|---|---|
| 601,170 | Great Britain | Apr. 29, 1948 |
| 710,959 | Great Britain | June 23, 1954 |
| 713,346 | Great Britain | Aug. 11, 1954 |